(12) United States Patent
Jeppesen et al.

(10) Patent No.: US 7,207,125 B2
(45) Date of Patent: Apr. 24, 2007

(54) GRID MIDSOLE INSERT

(75) Inventors: Michael Jeppesen, Beverly, MA (US);
Aaron Azevedo, Newbury, MA (US);
Gregg Duffy, Lynnfield, MA (US)

(73) Assignee: Saucony, Inc., Lexington, MA (US)

( * ) Notice: Subject to any disclaimer, the term of this patent is extended or adjusted under 35 U.S.C. 154(b) by 29 days.

(21) Appl. No.: 10/723,977

(22) Filed: Nov. 26, 2003

(65) Prior Publication Data

US 2005/0108898 A1    May 26, 2005

(51) Int. Cl.
*A43B 13/38* (2006.01)

(52) U.S. Cl. .................... 36/43; 36/30 R; 36/31

(58) Field of Classification Search .............. 36/43, 36/44, 3 B, 3 R, 30 R, 25 R, 31
See application file for complete search history.

(56) References Cited

U.S. PATENT DOCUMENTS

| 812,496 | A | | 2/1906 | Irwin |
| 1,650,466 | A | | 11/1927 | Righter |
| 2,347,207 | A | * | 4/1944 | Margolin ................... 36/3 B |
| 3,426,455 | A | * | 2/1969 | Vittorio ................... 36/3 B |
| 3,481,820 | A | * | 12/1969 | Jonas ....................... 428/77 |
| 4,297,796 | A | | 11/1981 | Stirtz et al. |
| 4,398,357 | A | * | 8/1983 | Batra ....................... 36/30 A |
| 4,594,799 | A | * | 6/1986 | Lin ........................... 36/114 |
| 4,608,768 | A | | 9/1986 | Cavanagh |
| 4,733,483 | A | | 3/1988 | Lin |
| 4,739,765 | A | * | 4/1988 | Sydor et al. ............. 36/174 |
| 4,815,221 | A | | 3/1989 | Diaz |
| 4,878,301 | A | | 11/1989 | Kiyosawa |

(Continued)

FOREIGN PATENT DOCUMENTS

EP    0795280 A2    9/1997

(Continued)

OTHER PUBLICATIONS

Internnational Search Report for PCT/US2004/034778.

(Continued)

*Primary Examiner*—Marie Patterson
(74) *Attorney, Agent, or Firm*—Wolf Greenfield & Sacks PC

(57) ABSTRACT

A midsole insert for use with a shoe is provided. The midsole insert includes a heel portion, a midfoot portion, and a forefoot portion, and a plurality of grid systems located on the midsole insert, where each grid system includes a plurality of openings cut into the midsole insert forming a lattice pattern. The plurality of grids may be located on at least one of the heel portion, the midfoot portion, and the forefoot portion, constructed to provide energy return features. The midsole may further be constructed and arranged to attach directly to an upper during a manufacturing step, to secure the shape of the upper on a last. By attaching directly to the upper, the midsole insert eliminates the need for a stroble board, which is typically used to secure the upper to the last. By eliminating the stroble board, the present invention places the midsole insert and the energy return grid system closer to the foot, which maximizes reaction time and performance. The midsole insert may be formed of at least two materials having different hardnesses, such that the heel portion has a greater hardness than the forefoot portion.

26 Claims, 5 Drawing Sheets

U.S. PATENT DOCUMENTS

| | | | |
|---|---|---|---|
| 5,070,629 A | 12/1991 | Graham et al. | |
| 5,255,451 A | 10/1993 | Tong et al. | |
| 5,402,588 A | 4/1995 | Graham et al. | |
| 5,469,639 A | 11/1995 | Sessa | |
| 5,561,920 A | 10/1996 | Graham et al. | |
| 5,588,226 A | 12/1996 | Schenkel | |
| 5,595,002 A | 1/1997 | Slepian et al. | |
| 5,718,063 A | 2/1998 | Yamashita et al. | |
| 5,722,186 A * | 3/1998 | Brown | 36/43 |
| 5,839,208 A * | 11/1998 | Huang | 36/28 |
| 5,852,886 A | 12/1998 | Slepian et al. | |
| 5,974,695 A | 11/1999 | Slepian et al. | |
| 5,983,529 A | 11/1999 | Serna | |
| 6,006,449 A | 12/1999 | Orlowski et al. | |
| 6,038,790 A | 3/2000 | Pyle et al. | |
| 6,205,683 B1 | 3/2001 | Clark et al. | |
| 6,216,365 B1 | 4/2001 | Cohen | |
| 6,231,946 B1 | 5/2001 | Brown, Jr. et al. | |
| 6,408,544 B1 | 6/2002 | Hernandez | |
| 6,418,641 B1 | 7/2002 | Schenkel | |
| 6,438,870 B2 | 8/2002 | Nasako et al. | |
| 6,467,197 B1 | 10/2002 | Mitsui et al. | |
| 6,601,321 B1 | 8/2003 | Kendall | |
| 6,655,048 B2 * | 12/2003 | Moretti | 36/3 R |
| 6,681,501 B1 * | 1/2004 | Polifroni | 36/3 B |
| 2002/0017036 A1 | 2/2002 | Berger et al. | |
| 2002/0092202 A1 | 7/2002 | Masseron | |
| 2002/0092203 A1 | 7/2002 | Hardt | |
| 2003/0145487 A1 * | 8/2003 | Hong | 36/3 R |
| 2004/0020075 A1 * | 2/2004 | Garneau | 36/3 B |

FOREIGN PATENT DOCUMENTS

| | | |
|---|---|---|
| EP | 1197157 A1 | 4/2002 |
| GB | 2243530 A | 11/1991 |

OTHER PUBLICATIONS

Written Opinion of International Searching Authority for PCT/US2004/034778.

* cited by examiner

GRID MIDSOLE INSERT

FIELD OF INVENTION

The present invention relates to shoe construction and, more particularly, to a shoe having improved energy return characteristics.

BACKGROUND OF INVENTION

There is substantial interest in improving the performance characteristics of athletic and walking shoes. Much recent industry interest relates to the manufacture of footwear having energy return characteristics. There is also a substantial interest in the ease of manufacturing such shoes.

Initial efforts directed at providing energy return systems were primarily directed to improving the cushioning and shock absorption with a range of synthetic materials. In particular, microcellular closed cell material and polyurethane systems have long been used in the commercial manufacture of a variety of midsole and wedge components intended to improve the comfort, cushioning and shock absorption of footwear. Other energy return systems have contemplated the use of thermoplastic hollow tubes or shapes encapsulating a fluid or gas that are strategically located in the midsole or elsewhere to provide an energy return mechanism to the shoe. Still other systems contemplate the use of such commercially available materials as HYTREL® and KEVLAR® in various blends, compositions and molded arrangements positioned in the arch and/or medial portion of the shoe providing mechanical cushioning and energy storage.

Netting or grid mesh arrangements have also been used in selected portions of a sole construction for various purposes. An example of one of the earliest of such efforts was in the form of a fine woven wire fabric described in U.S. Pat. No. 812,496, issued Feb. 13, 1906. Mesh used in that construction, however, provided only stiffness and wearing qualities at the bottom of the heel. That patent failed to suggest arranging the mesh under appropriate tension and thus fails to teach or suggest the use of such mesh in an energy return system. A second disclosure of a mesh construction is contained in U.S. Pat. No. 1,650,466 issued Nov. 22, 1927. In that construction, a fabric of mesh is used to retain the shape of a component and does not act as an energy return system such as a spring or the like.

More recently, U.S. Pat. No. 4,297,796, issued Nov. 3, 1981, discloses the use of an open work support or netting of stretch resistant threads secured to the top side of a flexibly deformable sole layer. This netting structure is intended to distribute shock stresses in the heel or ball of the foot. Since that open mesh is three-dimensional, it redistributes deformation of the sole structure under compression and does not function as a spring-like energy return system. Similarly, U.S. Pat. No. 4,608,768, issued Sep. 2, 1986 discloses the use of an open work structure embedded in a resilient member with plugs arranged within the openings of the open work structure. In such an arrangement, different shock absorbing characteristics may be imparted to selected portions of the sole structure. The mesh arrangement, itself, however does not appear to be used as a spring-like energy return system.

Most recently, U.S. Pat. No. 5,070,629, issued Dec. 10, 1991, discloses an energy return system that includes a rigid frame with a set of monofilaments or fibers secured under tension across the frame. The monofilaments or fibers form a spring-like system that stores energy during the compression portions of the gait cycle and releases energy during the push-off phase of the gait cycle. U.S. Pat. No. 5,402,588, issued Apr. 4, 1995, U.S. Pat. No. 5,561,920, issued Oct. 8, 1996, and U.S. Pat. No. 5,595,002, issued Jan. 21, 1997, disclose various improvements to this spring-like energy return system.

As stated above, there is a substantial interest in the ease of manufacturing such shoes. Typically athletic and walking shoes are manufactured by first forming and shaping the upper onto a last. The upper is then secured in this shape by attaching the upper to a stroble board along the bottom of the last. The stroble board is typically a thin fiberboard material. Thereafter, the midsole and outsole are secured, forming the shoe, and the stroble board is typically adhered to a portion of the sole of the shoe.

However, the present invention incorporates an energy return system into a midsole insert that thereby eliminates the need for a stroble board. The midsole insert of the present invention includes a plurality of grid systems which function as an energy return system, and further, the midsole insert may be attached directly to the upper during manufacturing, such that a conventional stroble board is not required.

SUMMARY OF INVENTION

In one embodiment, a midsole insert for a shoe is provided. The midsole insert includes a body having a heel portion, a midfoot portion, and a forefoot portion, and a plurality of grid systems located on the midsole insert. Each grid system includes a plurality of openings cut into the midsole insert, forming a lattice pattern, and the midsole is constructed and arranged to attach directly to an upper during a manufacturing step, to secure the shape of the upper on a last.

In another embodiment, a midsole insert for a shoe is provided. The midsole insert includes a body having a heel portion, a midfoot portion, and a forefoot portion, a first grid system located on the heel portion and a second grid system located on the forefoot portion, wherein each grid system includes a plurality of openings which form a lattice pattern. The midsole insert is formed of at least two materials having different hardnesses, such that a majority of the heel portion has a greater hardness than the forefoot portion.

Another embodiment of the invention is a method of manufacturing a shoe. An upper, a midsole insert with at least one grid system including a plurality of openings forming a lattice pattern, a sock lining, a midsole, and an outsole is provided. The shoe is formed by forming and shaping the upper onto a last and attaching the midsole insert directly to the upper to secure the shape of the upper on the last. The midsole is attached to at least one of the midsole insert and the upper, and the outsole is attached to at least one of the midsole, the midsole insert, and the upper. The last is then separated from the upper, and the sock lining is positioned on the topside of the midsole insert.

In yet another embodiment, a shoe is provided. The shoe includes a conventional upper, such as a textile and synthetic upper, and a midsole insert having a heel portion, a midfoot portion, and a forefoot portion, attached directly to the upper. At least part of the forefoot portion is made of a first material and at least part of both the heel and midfoot portions are made of a second material, where the stiffness of the first material is less than the stiffness of the second material. The outsole is attached to the underside of the midsole insert, and a sock lining is inserted into the shoe, positioned on the topside of the midsole insert. The midsole insert further includes a plurality of grid systems located on the midsole insert, where each grid system includes a plurality of openings forming a lattice pattern on the midsole insert.

Various embodiments of the present invention provide certain advantages and overcome certain limitations of prior shoes. Embodiments of the present invention may not share the same advantages, and those that do may not share them under all circumstances. Further, the elements of a particular midsole insert embodiment described herein may be arranged in any suitable combination to provide a different embodiment, as the present invention is not limited in this respect.

BRIEF DESCRIPTION OF DRAWINGS

Various embodiments of the invention will now be described, by way of example, with reference to the accompanying drawings, in which.

DETAILED DESCRIPTION

Aspects of the invention are directed to a midsole insert having energy return grid systems incorporated into the midsole insert itself. The energy return system of the present invention includes the use of components in the midsole region that provide both cushioning and energy return characteristics. These components may be selectively employed in the heel, midfoot, and/or the forefoot portions to provide the desired energy return characteristics for a particular type of shoe. These components may be especially designed for use in walking shoes or specific types of athletic shoes, such as basketball or running shoes. Further, the design of the midsole insert is a full footed design supporting the entire bottom of the wearer's foot. In one embodiment, the midsole insert is a single molded design featuring the grid energy return technology to address all phases of the gait cycle, and this new design replaces conventional running shoe designs which feature several components of midsole technology.

In some embodiments, the midsole insert is constructed and arranged to attach directly to an upper during a manufacturing step, to secure the shape of the upper on a last. As described in further detail below, this eliminates the need for a stroble board, which is typically used to secure the shape of the upper on a last in many conventional methods of shoe manufacturing. Also, as described in more detail below, the direct attachment of the midsole insert to the upper positions the energy return grid technology closer to the foot, this maximizing reaction time and performance.

Overall Construction

Figure 2:
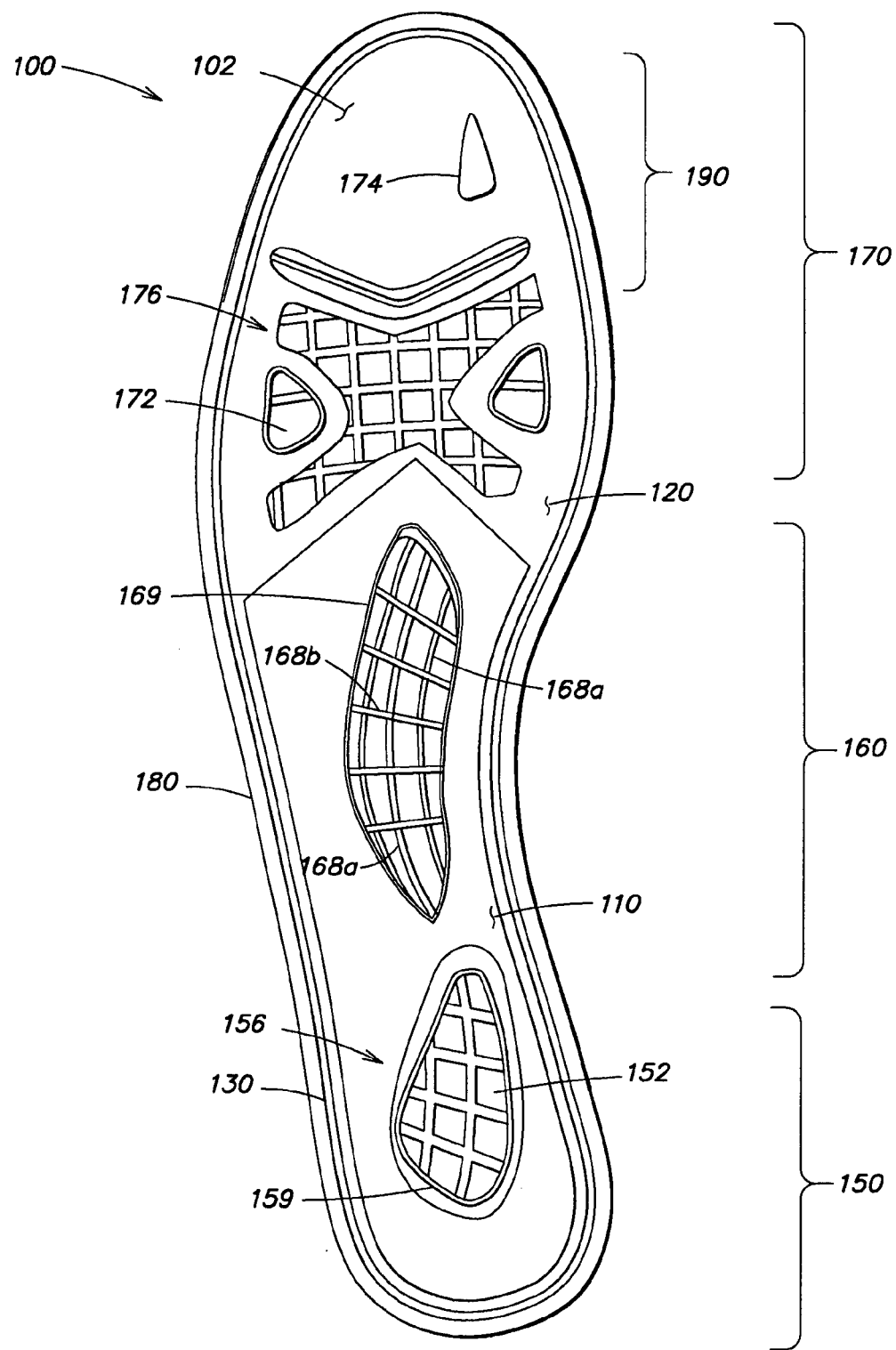
FIG. 2 is a bottom-plan view of the midsole insert of the present invention.
Figure 3:
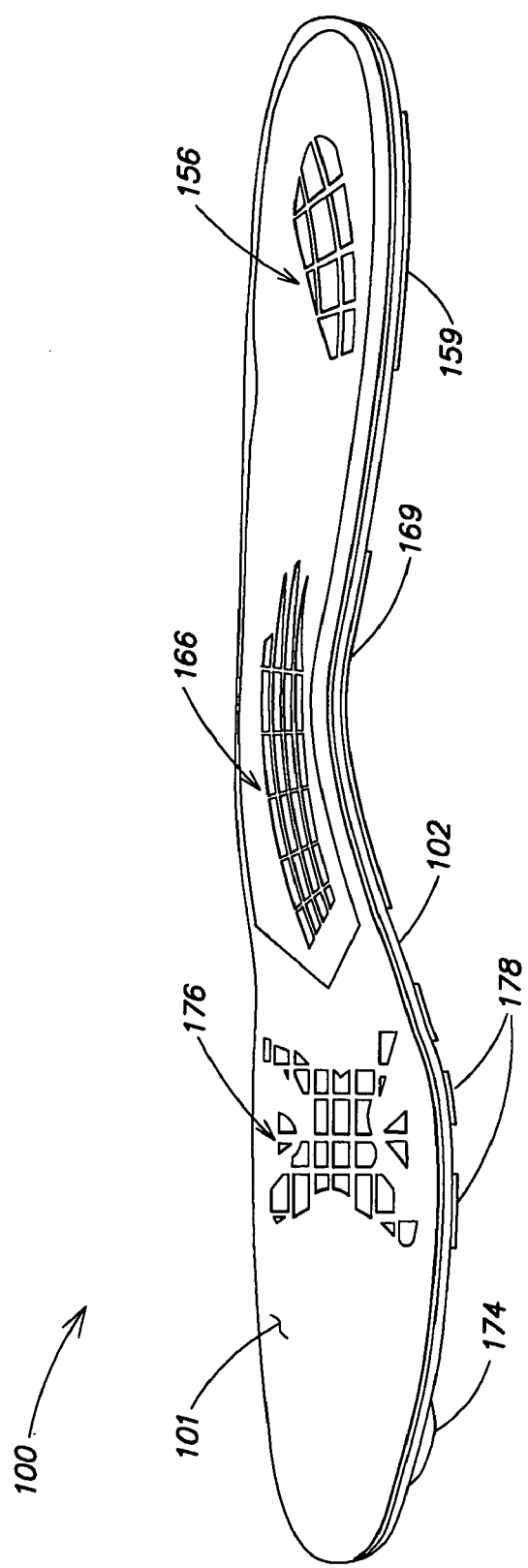
FIG. 3 is a side perspective view of the midsole insert of FIGS. 1–2.
Figure 4:
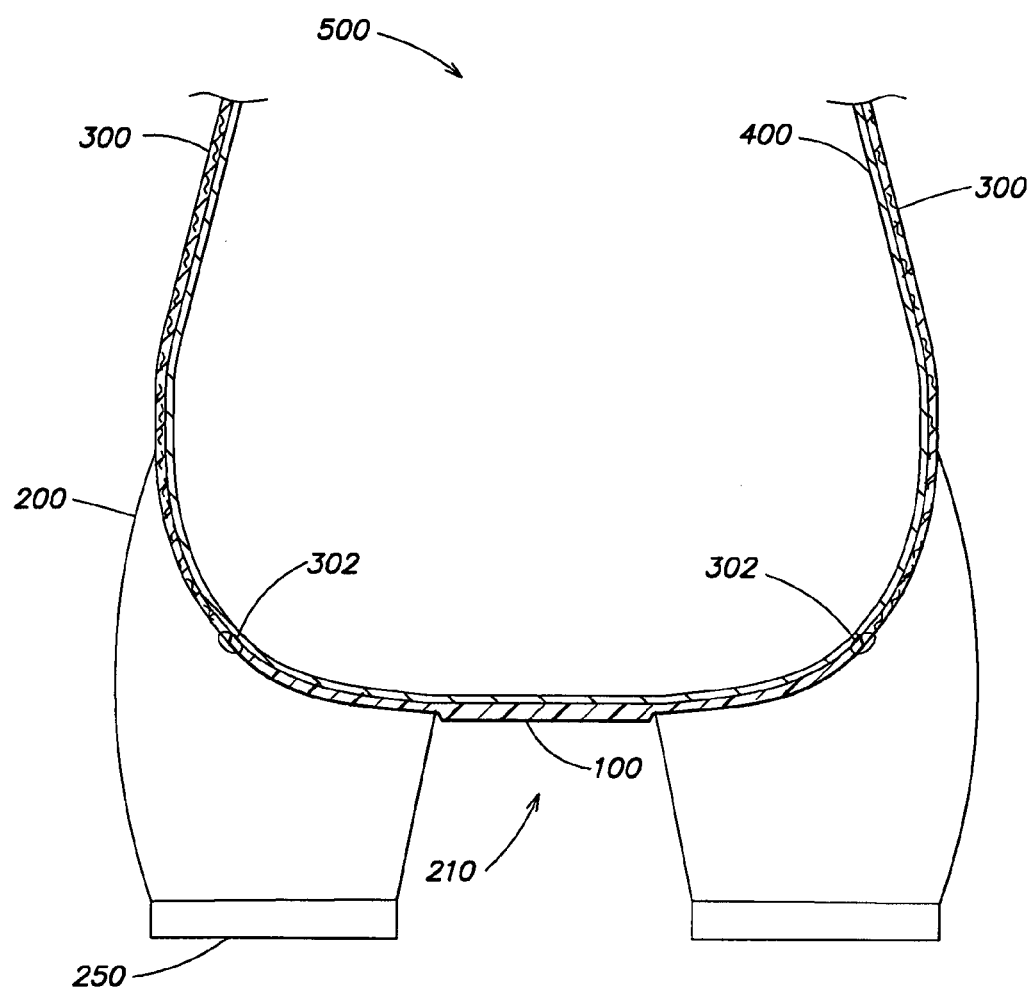
FIG. 4 is a cross-sectional view of a shoe manufactured with the midsole insert of the present invention.

Referring to the embodiments shown in FIGS. 1–4, there is illustrated a semi-rigid midsole insert 100. In this embodiment, the midsole insert 100 in the assembled shoe 500 lies between the outsole 200 and the upper 300, as can be seen in FIG. 4. The midsole insert 100 of this embodiment is attached directly to the upper 300 and the outsole 200 is affixed to the midsole insert 100 using any appropriate method, such as with any of a number of conventional adhesives and or stitching. A sock liner 400 lies between the midsole 100 and the foot of the wearer (not shown), and the outsole 200 may have an additional tread layer 250 affixed to its bottom surface. In one embodiment, the sock liner 400 is constructed from a LYCRA® material that manages moisture in the shoe. The outsole 200 may contain one material, or it may alternatively include several layers of different materials. It may also have an opening or recessed segment as illustrated at 22 in FIG. 3 of U.S. Pat. No. 5,402,588.

Midsole

The midsole insert 100 may be formed of a single material, or it may be formed of more than one material. In the embodiment shown in FIGS. 1–3, for example, the midsole 100 is made of two different portions, a center portion 110 and a peripheral portion 120, each of which is made of a different material. The center and peripheral portions 110, 120 of this embodiment, while formed in separate steps and have different physical characteristics, they nevertheless comprise an integral midsole 100. The center portion 110 forms an inner part of the midsole insert 100 that extends from approximately the heel area 150 through approximately the midfoot area 160, while the peripheral portion 120 forms the balance of the midsole insert 100, encompassing a majority of the forefoot area 170 and the perimeter 180 of the midsole insert 100. While the center and peripheral portions 110, 120 of this embodiment are formed from various plastics and combinations of polymers, it should be appreciated that the midsole insert 100 may be made of any suitable material, including plastics, rubbers, and natural or synthetic fabrics, as well as any suitable combination of such materials. In one embodiment, when forming the midsole insert 100, a first material is injection molded into the shape of the forefoot portion and the frame extending about the perimeter, and a second material is co-injected molded into the shape of the heel and midfoot portions, upon the first material.

In one embodiment, the midsole insert 100 is constructed and arranged such that a conventional stroble board is not required in the shoe manufacturing process. Typically athletic and walking shoes are manufactured by first forming and shaping the upper onto a last. The upper is then secured in this shape by attaching the upper to a stroble board along the bottom of the last. Although any type of upper may be implemented with the midsole insert, in one embodiment, the upper is made with a seamless design, which may be created by fusing synthetic leather and breathable mesh parts, rather than stitching the components together. The fused upper eliminates the friction and irritation which may be caused by seams, layers, and threads. The stroble board is typically constructed from a thin fiberboard material. Thereafter, any outsole and midsole are secured, forming the shoe, and the stroble board is typically adhered to a portion of the sole of the shoe. Although the stroble board helps secure the shape of the upper, it would be advantageous to simplify the manufacturing process by eliminating the need for a stroble board. The present invention combines the function of a stroble board with the midsole technology, such that only one midsole insert is needed.

In addition to the ease of manufacturing, directly attaching the midsole insert to the upper enables the energy return grid technology to be positioned closer to the foot. In conventional shoe designs that feature some sort of grid system, the stroble board separated the grid from the foot. This arrangement of the present invention may maximize reaction time and overall performance.

As shown in particular in FIG. 4, the midsole insert 100 is attached directly to the upper 300. Although the two components may be attached in a variety of methods, such as stitched, sealed, cemented, etc., the embodiment shown in FIG. 4 illustrates the midsole insert 100 stitched directly to the upper 300 in a zigzag chain stitch pattern about the perimeter of the midsole insert 100. In one embodiment, the direct attachment 302 of the upper 300 to the midsole insert 100 is facilitated by constructing the midsole insert such that the thickness of the perimeter 180 is less than the thickness of the body of the midsole insert. This reduced thickness area allows for the upper to attach to the perimeter of the midsole insert more easily, especially if the components are stitched together. Further, the reduced thickness perimeter does not compromise the rigidity or stability of the main body of the midsole insert. In one embodiment, the direct attachment of the upper 300 to the midsole insert 100 is further facilitated with a groove 130 that extends about at least a portion of the perimeter 180 of the midsole insert. As shown in FIG. 2, the groove 130 may be more prominent on the bottom surface 102 of the insert.

The various materials that make up the midsole 100 can have varying physical compositions, so as to have physical characteristics (weight, strength, hardness, brittleness, etc.) that are most suited for the portion of the midsole 100 that they comprise. In the particular embodiment of FIG. 1–3, the center portion 110 is made of a plastic that is harder than the plastic that makes up the peripheral portion 120; accordingly, the center portion provides more stability and rigidity in the heel and midfoot areas, while the peripheral portion provides more flexibility in the forefoot area and helps facilitate the stitching of the midsole 100 to the upper 300. In one embodiment, the durameter of the peripheral portion 120 is approximately between 92–98A, and the durameter of the center portion 110 is approximately within the range of 57–63D. In one particular embodiment, the durameter of the peripheral portion 120 is about 95A and the durameter of the center portion 110 is about 60D. In one embodiment, the center portion 110, including both the midfoot and heel sections, is constructed of two thicknesses of PEBAX® material; one layer providing cushioning while the other layer provides support and torsional rigidity. In one embodiment, the peripheral portion 120, including both the forefoot and toe sections, is constructed of thermoplastic urethane, a polymer that provides support without inhibiting flexibility. In one embodiment, the materials of the center and peripheral portions 110, 120 work in unison with the energy return grid systems to fluidly support the foot's natural motion. Because the present invention incorporates all of the midsole technology into one integrated piece (without additional add-on features), the run, or walk, is smoother and more effortless. The materials that make up the midsole 100 can be selected to have characteristics that best suit the particular type of shoe (running, walking, basketball, etc.) being constructed, and/or the particular individual or type of individual for whom the shoe is designed. The materials may also be of various colors, may be wholly or partially transparent, and may have any appropriate texture or other surface markings, so as to provide various aesthetic effects.

In the embodiment shown in FIGS. 1–7, the midsole insert 100 is not flat, but rather has a gently cupped shape, so as to approximate the contour of the bottom of a foot. The cupping is more pronounced in the heel and midfoot areas, where feet are generally more rounded, and less pronounced in the forefoot area, where feet are generally more flat. In accordance with the invention, the amount of contour can be varied to accommodate different shaped feet or gaits and to best suit a particular intended activity. For example, the midsole insert 100 may be highly rounded in the heel area 150 to provide stability.

Figure 1:
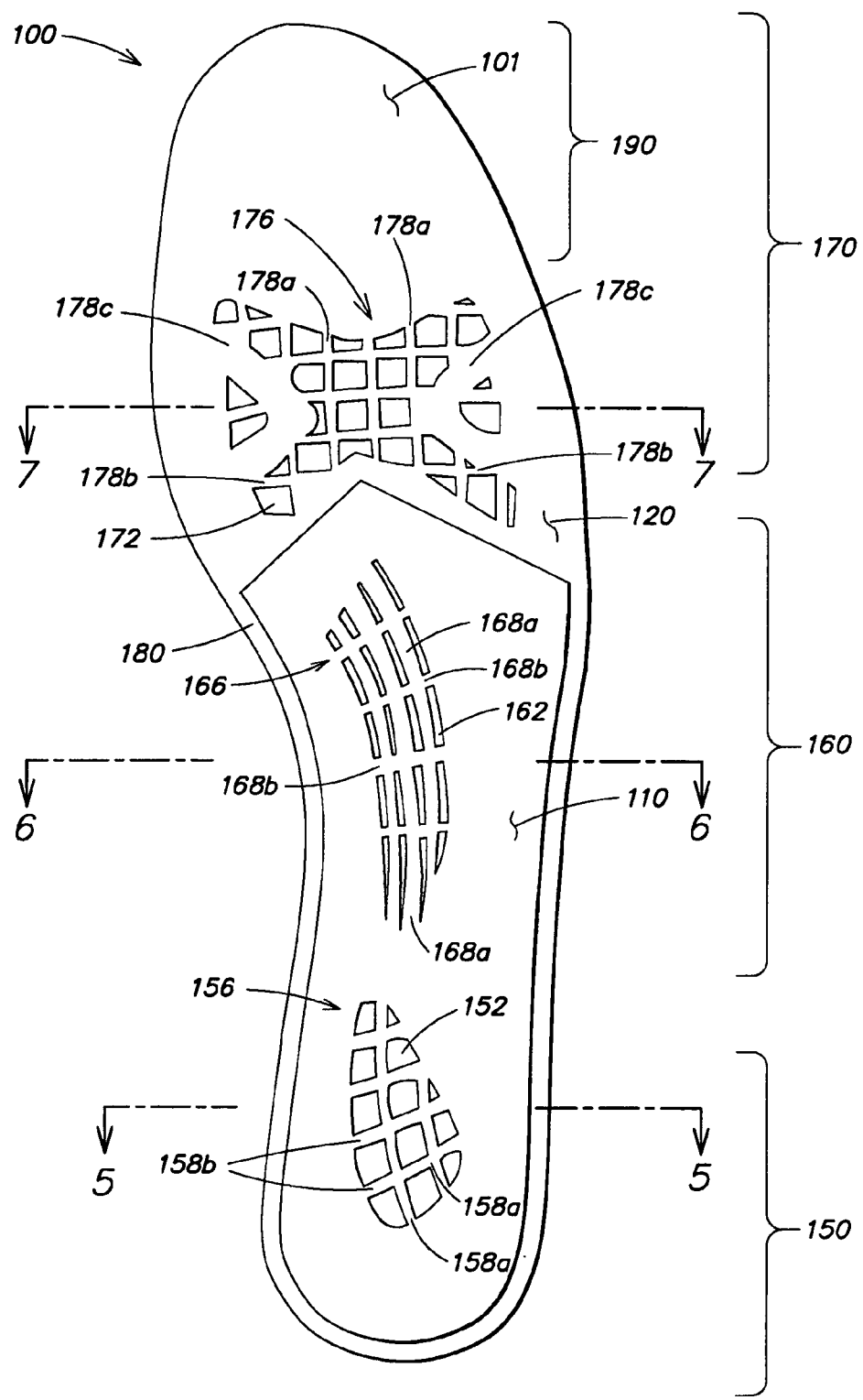
FIG. 1 is a top-plan view of the midsole insert of the present invention.

The midsole insert 100 of the embodiment illustrated in FIGS. 1–2 is constructed in four zones to most efficiently respond to the four parts of the human gait cycle. The four zones correspond to the heel 150, midfoot 160, forefoot 170, and toe 190 portions of the midsole insert, where the toe portion 190 may be part of the forefoot 170 portion.

Heel Area

The heel area 150 of the midsole insert 100 in one embodiment includes a heel opening 152. Extending across the heel opening 152 is a molded heel grid 156 that may have a slightly convex shape. In one embodiment, the heel grid 156 is integrally formed of the material that forms the center portion 110. For example, the grid may be cut into the midsole insert. It should be appreciated, however, that the heel grid 156 may also made, in whole or in part, of a different material than the rest of the midsole 100 and may be formed independently of the midsole insert 100, being applied or attached by any appropriate method. The heel grid 156 is made up of a first set of ribs 158a crossing a second set of ribs 158b. The two sets of ribs 158a, 158b may be integrally connected at their intersections 80 (such as when they are both integrally molded with a portion of the midsole insert 100), one may simply lie across the other, or they may be wholly or partially interwoven. The ribs 158a, 158b in the grid system are suitably taut, thereby forming a spring-like member which is resilient. Therefore, the heel grid 156 is capable of deflection and return when impacted by the force of the heel of the foot. The grids function as spring-like systems in selected areas of the midfoot insert for the purpose of storing energy in running and/or jumping during compression portions of the gait cycle and for releasing energy during the push-off phase of the gait cycle. In general, the heel area 150 may have a decoupled heel strike down area to lengthen the time of impact, to further provide cushioning, and to reduce the rate of pronation.

Figure 5:
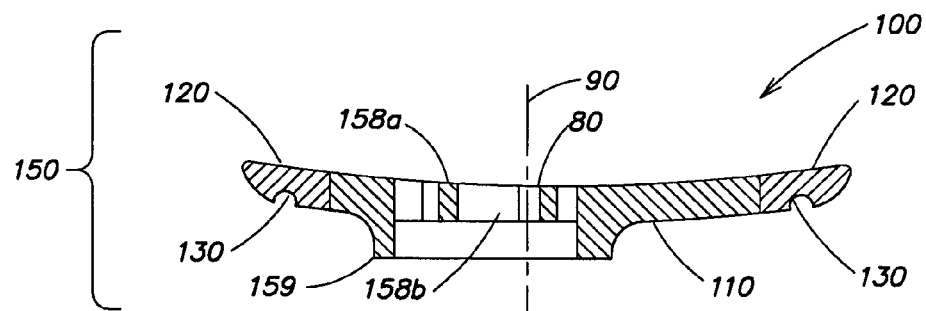
FIG. 5 is a cross-sectional view of the midsole insert taken along the line 5—5 of FIG. 1.

In the embodiment disclosed in FIGS. 1–3 and 5, the heel grid 156 is arranged such that the first set of ribs 158a generally run in the direction from the heel 150 to the forefoot 170, while the second set of ribs generally run from the lateral to the medial side. Different grid patterns, however, may help to counter pronation. Also, although as shown in the figures, the ribs 158a, 158b are all flush with the top surface 101 of the midsole insert 100, the thickness of the ribs 158a, 158b may vary. Additionally, at least a portion of the ribs may form ridges that protrude out from the bottom surface 102 of the midsole insert 100. As shown in FIGS. 2–3 and 5, the perimeter 159 of the heel grid 156 protrudes from the bottom surface 102 of the midsole insert. It should be understood, of course, that this arrangement is merely illustrative and that other arrangements of the heel grid 156 fall within the scope of the invention. Also, as shown in FIGS. 1–2 and 5, in one embodiment, the heel grid 156 is positioned offset from the centerline 90 of the midsole insert, closer to the medial side of the midsole insert. The heel opening 152 and heel grid 156 of this embodiment may lie above a rear opening 210 in the outsole 200, allowing the heel grid 156 to flex freely and allowing the heel grid 156 to be seen and perhaps touched from the bottom of the shoe. In other embodiments, the outsole 200 may include a heel insert (not shown) that partially or fully covers the rear opening 210.

Midfoot Area

The midfoot area 160 of the midsole insert 100 also may include a midfoot opening 162. Extending across the opening is a molded midfoot grid 166 which may have a convex shape. Similar to the heel grid 156, the midfoot grid 166 may either be integrally molded from the material that forms the center portion 110, or it may be formed independently of the midsole insert and applied or attached separately. In one embodiment, the grid is cut into the midsole insert. The midfoot grid 166 is made up of at least a first set of ribs 168a crossing a second set of ribs 168b which may be integrally connected at their intersections, or they may lie across each other, or they may be wholly or partially interwoven. The midfoot area 160 may include a pronation phase having an angled medial side of the midsole to help reduce the angle of pronation. The midfoot area 160 may also form a deep center channel to improve the support and stability of a foot in the shoe by keeping the foot centered in a more neutral position.

Figure 6:
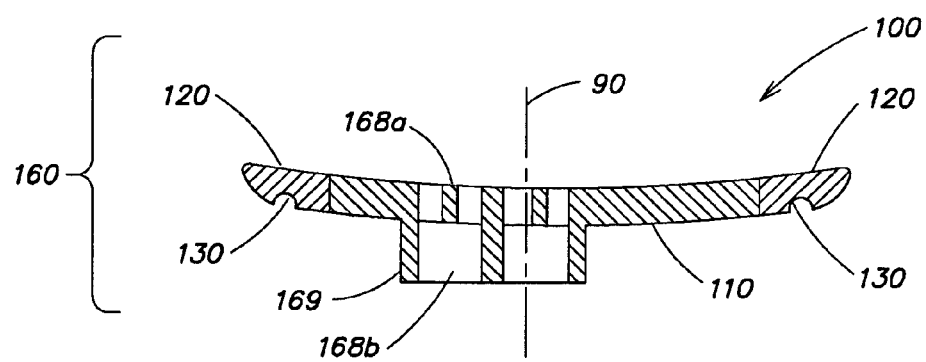
FIG. 6 is a cross-sectional view of the midsole insert taken along the line 6—6 of FIG. 1.

Although the midfoot grid 166 is similar to the heel grid 156, the midfoot grid 166 typically provides greater torsion resistance, rigidity, and stability, in comparison to the heel grid 156. These above characteristics are desirable in the midfoot section, to better control the movement of the arch of the foot. Increased torsion resistance, rigidity, and stability may be achieved by reducing the spacing between the ribs, increasing the overall size or thickness of the ribs, increasing the amount of material in the grid, and/or implementing a more rigid material in the grid. As shown in FIGS. 2–3 and 6, the perimeter 169 of the midfoot grid, the second set of ribs 168b, and some of the first set of ribs 168a form ridges on the underside that protrude from the bottom of the midsole insert 100, while some of the first set of ribs 168a have a smaller thickness that do not protrude through the bottom surface 102 of the midsole insert 100.

Although the shape or pattern of the midfoot grid is not limited to a particular embodiment, it may be beneficial if the midfoot ribs are aligned such that the first set of ribs 168a follow the shape of the adjacent contour of the medial side of midsole insert 100, while some of the second set of ribs 168b are aligned to extend at varying diagonals from the medial to the lateral side of the midsole insert. Further, it may be beneficial for all of the ribs to be flush with the top surface 101 of the midsole insert. Also, in one embodiment, the midfoot grid 166 is positioned offset from the centerline 90 of the midsole insert, closer to the medial side of the midsole insert. In one embodiment, the midfoot opening 162 and midfoot grid 166 lie above an opening 210 in the outsole 200, allowing the midfoot grid 166 to flex freely and allowing the midfoot grid 166 to be seen and perhaps touched from the bottom of the shoe. In other embodiments, the outsole 200 may include an insert (not shown) that partially or fully covers the opening 210.

Although a midfoot grid 166 is shown in several of the figures, in one embodiment, the midsole insert 100 does not have a midfoot grid 166. Alternatively, the midfoot area 160 may contain a region of increased rigidity due to either an area of increased thickness and/or a more rigid material.

Forefoot Area

The forefoot area 170 of the midsole insert 100 also may include at least one forefoot opening 172. Extending across the opening is a molded forefoot grid 176 which may have a convex shape. The forefoot grid 176 may either be integrally molded from the material that forms the peripheral portion 120, or it may be formed independently of the midsole insert and applied or attached separately. In one embodiment, the grid is cut into the midsole insert. The forefoot grid 176 is made up of at least a first set of ribs 178a crossing a second set of ribs 178b which may be integrally connected at their intersections, or they may lie across each other, or they may be wholly or partially interwoven. Similar to the previously described grids, the forefoot grid 176 functions as spring-like system in selected areas for the purpose of storing energy in running and/or jumping during compression portions of the gait cycle and for releasing energy during the push-off phase of the gait cycle. In one embodiment, the forefoot grid 176 contains a third set of ribs 178c which may provide more stability to the medial and lateral side of the midsole insert. Although the forefoot grid 176 is shown in the figures as being centered on the centerline 90 of the midsole insert between the medial and lateral sides, in some embodiments, the grid may be offset to either side. The forefoot area 170 may include medial and lateral forefoot voids, or areas where there are depressions on the top surface 101 of the midsole insert in the forefoot area to enhance forefoot cushioning and flexibility. Further, the toe section 190 of the forefoot area, may be angled to help align the foot in proper position.

In one embodiment, it may be desirable to have more flexibility in the forefoot area in comparison to the midfoot or heel areas. By altering the forefoot grid 170 design one can effectively achieve the desired amount of flexibility. Also, as discussed above, if the peripheral portion 120 is constructed from a material that is less rigid than the center portion 100, the forefoot area 170 will be more flexible in comparison to the midfoot and heel areas. Also, as stated above in connection with the other grid systems, although the shape or pattern of the forefoot grid is not limited to a particular embodiment, it may be beneficial if the forefoot ribs are aligned such that the first set of ribs 178a follow a relatively linear path extending between the toe and heel portions, while the second set of ribs 178b are aligned to extend between the medial side and the lateral side of the midsole insert. Further, it may be beneficial for all of the ribs to be flush with the top surface 101 of the midsole insert. The forefoot opening 172 and forefoot grid 176 may lie above an opening 210 in the outsole 200, allowing the forefoot grid 176 to flex freely and allowing the forefoot grid 176 to be seen and perhaps touched from the bottom of the shoe. In other embodiments, the outsole 200 may include an insert (not shown) that partially or fully covers the opening 210.

Figure 7:
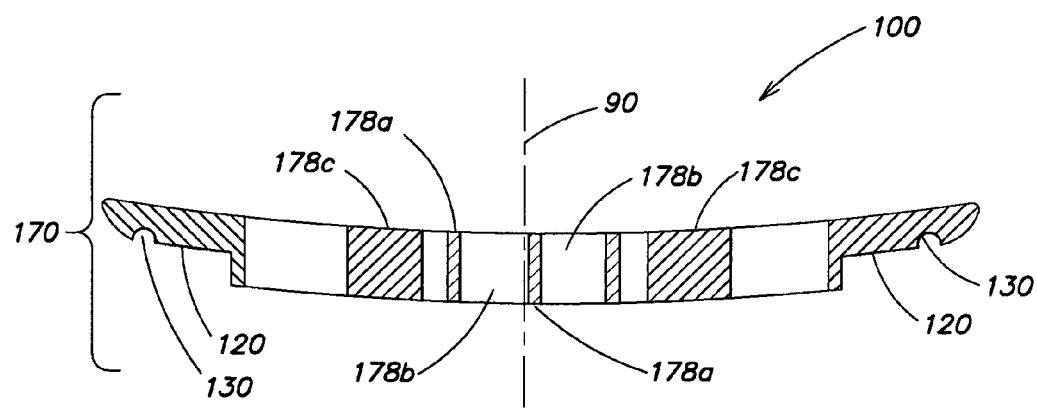
FIG. 7 is a cross-sectional view of the midsole insert taken along the line 7—7 of FIG. 1.

Further, as shown in FIGS. 2–3 and 7, portions of the forefoot area may protrude from the bottom of the midsole insert 100. For example, at least a portion of the rib 178 pattern may form ridges that protrude through the bottom surface 102. In one embodiment, a raised toe section 174 also protrudes from the bottom surface of the insert in the toe portion 190. This toe section 174 is positioned on the midsole insert to correspond with at least the large toe of a foot. This area of increased thickness provides additional support to the foot during the full gait cycle. Additionally, in one embodiment, another protrusion extends on the bottom side of the midsole insert to align and position the midsole insert with respect to a mold used to form the lattice pattern of the grid systems. This protrusion is not limited to a specific shape, although it is shown in one embodiment in FIG. 2 as a raised V-shaped section 192 formed on the underside of the forefoot portion.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A midsole insert for a shoe, comprising:
    a body having a heel portion, a midfoot portion, and a forefoot portion;
    a plurality of energy return grid systems located on the midsole insert, wherein each energy return grid system includes a plurality of openings through the midsole insert, forming a taut lattice pattern, which forms a spring-like member capable of deflection and return;
    wherein the midsole insert is constructed and arranged to attach directly to an upper during a manufacturing step, to secure the shape of the upper on a last;
    wherein a first grid system is located on the heel portion and a second grid system is located on the forefoot portion;
    wherein the midsole insert is formed of at least two materials having different hardnesses, such that a majority of the heel portion and midfoot portion have a greater hardness than the forefoot portion; and
    a third grid system located on the midfoot portion, wherein a portion of the third grid system has an increased thickness relative to a section of the midfoot portion without a grid system.

2. A midsole insert for a shoe, comprising:
    a body having a heel portion, a midfoot portion, and a forefoot portion;
    a plurality of grid systems located on the midsole insert, wherein each grid system includes a plurality of openings into the midsole insert, forming a lattice pattern;
    wherein the midsole insert is constructed and arranged to attach directly to an upper during a manufacturing step, to secure the shape of the upper on a last;
    wherein a first grid system is located on the heel portion and a second grid system is located on the forefoot portion;
    wherein the midsole insert is formed of at least two materials having different hardnesses, such that a majority of the heel portion and midfoot portion have a greater hardness than the forefoot portion; and
    wherein the forefoot portion and a frame extending about the perimeter of the midsole insert are integrally molded from a first material, and the heel and midfoot portions are integrally molded together from a second material.

3. The midsole insert of claim 2, wherein the first material is injection molded into the shape of the forefoot portion and the frame extending about the perimeter, and the second material is co-injected molded into the shape of the heel and midfoot portions, upon the first material.

4. The midsole insert of claim 2, wherein the durameter of the first material is approximately within the range of 92–98A, and the durameter of the second material is approximately within the range of 57–63D.

5. The midsole insert of claim 4, wherein the durameter of the first material is approximately 95A.

6. The midsole insert of claim 4, wherein the durameter of the second material is approximately 60D.

7. A midsole insert for a shoe, comprising:
    a body having a heel portion, a midfoot portion, and a forefoot portion;
    a first energy return grid system located on the heel portion and a second energy return grid system located on the forefoot portion, wherein each energy return grid system includes a plurality of openings which form a taut lattice pattern; which forms a spring-like member capable of deflection and return; and
    wherein the midsole insert is formed of at least two materials having different hardnesses, such that a majority of the heel portion has a greater hardness than the forefoot portion.

8. The midsole insert of claim 7, wherein said first energy return grid system is discrete from said second energy return grid system.

9. The midsole insert of claim 7, further comprising a third grid system located on the midfoot portion, wherein the grid system includes a plurality of openings which form a lattice pattern.

10. The midsole insert of claim 9, wherein a portion of the third grid system located on the midfoot portion has an increased thickness relative to a section of the midfoot portion without the grid system.

11. The midsole insert of claim 10, wherein at least a portion of the third grid system includes ridges located on the underside of the midsole insert.

12. The midsole insert of claim 10, wherein the portion of the increased thickness of the third grid system extends longitudinally from a position adjacent the rear of the forefoot portion to a position adjacent the heel portion to provide increased resistance to torsional motion.

13. The midsole insert of claim 7, wherein a portion of the first grid system located on the heel portion has an increased thickness relative to a section of the heel portion without the grid system.

14. The midsole insert of claim 13, wherein at least a portion of the first grid system includes ridges located on the underside of the midsole insert.

15. The midsole insert of claim 9, wherein the second grid system located on the forefoot portion is wider than either the first or third grid system.

16. The midsole insert of claim 7, further comprising a raised toe section formed on the underside of the forefoot portion which provides additional support to a toe.

17. The midsole insert of claim 7, further comprising a raised V-shaped section formed on the underside of the forefoot portion which aligns and positions the midsole insert with respect to a mold used to form the lattice pattern of the grid systems.

18. A midsole insert for a shoe, comprising:
    a body having a heel portion, a midfoot portion, and a forefoot portion;
    a first grid system located on the heel portion and a second grid system located on the forefoot portion, wherein each grid system includes a plurality of openings which form a lattice pattern;
    wherein the midsole insert is formed of at least two materials having different hardnesses, such that a majority of the heel portion has a greater hardness than the forefoot portion; and wherein the forefoot portion and a frame extending about the perimeter of the midsole insert are integrally molded from a first material, and the heel and midfoot portions are integrally molded together from a second material, wherein the stiffness of the first material is less than the stiffness of the second material.

19. The midsole insert of claim 18, wherein the thickness of the frame extending about the perimeter of the midsole insert is less than the thickness of the body of the midsole insert.

20. The midsole insert of claim 18, further comprising a groove extending substantially about the perimeter of the midsole insert, the groove providing a region to attach a shoe upper directly to the midsole insert.

21. A midsole insert for a shoe, comprising:
   a body having a heel portion, a midfoot portion, and a forefoot portion;
   a first grid system located on the heel portion and a second grid system located on the forefoot portion, wherein each grid system includes a plurality of openings which form a lattice pattern;
   wherein the midsole insert is formed of at least two materials having different hardnesses, such that a majority of the heel portion has a greater hardness than the forefoot portion; and
   wherein the first grid system is integrally molded with the heel portion of the midsole insert and the second grid system is integrally molded with the forefoot portion of the midsole insert.

22. The midsole insert of claim 9, wherein the third grid system is integrally molded with the midfoot portion of the midsole insert.

23. The midsole insert of claim 9, wherein the midsole insert has a lateral side and a medial side, and the third grid system located on the midfoot portion is positioned offset to the medial side of the midsole insert rather than the lateral side.

24. The midsole insert of claim 9, wherein the openings forming the lattice pattern on the first grid system on the heel portion are larger than the openings forming the lattice pattern on the third grid system on the midfoot portion.

25. The midsole insert of claim 7, wherein the size and shape of the plurality of openings in at least one grid system are non-uniform.

26. A shoe comprising:
   a textile and synthetic upper;
   a midsole insert having a heel portion, a midfoot portion, and a forefoot portion, attached directly to the upper, wherein at least part of the forefoot portion is made of a first material and at least part of both the heel and midfoot portions are made of a second material, wherein the stiffness of the first material is less than the stiffness of the second material;
   an outsole attached to the underside of the midsole insert;
   a sock lining inserted into the shoe positioned directly on the topside of the midsole insert; and
   wherein the midsole insert further includes a plurality of energy return grid systems located on the midsole insert, wherein each energy return grid system includes a plurality of openings forming a taut lattice pattern on the midsole insert; which forms a spring-like member capable of deflection and return.

* * * * *